(12) United States Patent
Yoon et al.

(10) Patent No.: US 8,737,544 B2
(45) Date of Patent: May 27, 2014

(54) METHOD AND APPARATUS OF ESTIMATING FREQUENCY OFFSET BASED ON PARTIAL PERIODOGRAM IN WIRELESS COMMUNICATION SYSTEM

(75) Inventors: Seokho Yoon, Suwon-si (KR); Dahae Chong, Suwon-si (KR); Junhwan Kim, Suwon-si (KR); Seung Goo Kang, Suwon-si (KR); Youngpo Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 150 days.

(21) Appl. No.: 13/598,184

(22) Filed: Aug. 29, 2012

(65) Prior Publication Data

US 2013/0051447 A1    Feb. 28, 2013

(30) Foreign Application Priority Data

Aug. 30, 2011    (KR) ........................ 10-2011-0087120

(51) Int. Cl.
*H04L 27/06*    (2006.01)

(52) U.S. Cl.
USPC .......................................... 375/344

(58) Field of Classification Search
USPC ................... 375/295, 316, 344, 343
See application file for complete search history.

(56) References Cited

U.S. PATENT DOCUMENTS

| | | | |
|---|---|---|---|
| 2013/0129006 A1* | 5/2013 | Kumar Reddy et al. | 375/295 |
| 2014/0064411 A1* | 3/2014 | Nam et al. | 375/316 |

OTHER PUBLICATIONS

Ren et al, "An Efficient Frequency Offset Estimation Method with Large Rangefor Wireless OFDM Systems" IEEE Trans, Vechicular Technology, vol. 56, pp. 1892-1895, Jul. 2007.*
Lei et al, "Periodogram-based Carrier Frequency Offset Estimation for Orthogonal Frequency Division Multiplexing Applications" IEEE Global Telecommunications Conference, 2001 V5, pp. 3070-3074.*
S. Kim, D. Chong, S. Y. Kim, and S. Yoon, "A novel periodogram-based frequency offset estimation method for OFDM systems," Proc. Int. Technical Conf. Circuits/Systems, Comp., and Comm. (ITC-CSCC), pp. 97-100, Shimonoseki, Japan, Jul. 2008.*
S. G. Kang, D. Chong, Y. Lee, and S. Yoon, "A robust periodogram-based IFO estimation scheme for OFDM-based wireless systems," Proc. Int. Conf. Commun. Theory, Reliability, and Quality of Service (CTRQ), pp. 43-46, Budapest, Hungary, Apr. 2011.*
Jan-Jaap van de Beek, et al. (Jul. 1997). "ML Estimation of Time and Frequency Offset in OFDM Systems." *IEEE Transactions on Signal Processing*, vol. 45, No. 7: pp. 1800-1805.
Timothy M. Schmidl et al., (Dec. 1997). "Robust Frequency and Timing Syncronization for OFDM." *IEEE Transactions on Communication.* vol. 45, No. 12: pp. 1613-1621.

* cited by examiner

Primary Examiner — Jaison Joseph
(74) *Attorney, Agent, or Firm* — NSIP Law

(57) ABSTRACT

A method and an apparatus of estimating a frequency offset in a wireless communication system are provided. An orthogonal frequency division multiplexing (OFDM) receiver performs envelope equalized processing (EEP) with respect to a reception signal and calculates a partial periodogram with a plurality of test values based on the reception signal which goes through the EEP. The OFDM receiver estimates a first frequency offset, a second frequency offset, and a third frequency offset based on two partial periodograms adjacent to each other among the partial periodograms for the plurality of test values.

20 Claims, 7 Drawing Sheets

METHOD AND APPARATUS OF ESTIMATING FREQUENCY OFFSET BASED ON PARTIAL PERIODOGRAM IN WIRELESS COMMUNICATION SYSTEM

CROSS-REFERENCE TO RELATED APPLICATIONS

This application claims the benefit of priority of Korean Patent application No. 10-2011-0087120 filed on Aug. 30, 2011, which is incorporated by reference.

BACKGROUND OF THE INVENTION

1. Field of the Invention

The present invention relates to wireless communication, and more particularly, to a method and an apparatus of estimating a frequency offset based on a partial periodogram in a wireless communication system.

2. Related Art

In the case of a broadband wireless communication system, effective transmission/reception techniques and utilization schemes have been proposed in order to maximize efficiency of limited wireless resources. Next-generation wireless communication is an orthogonal frequency division multiplexing (OFDM) system capable of reducing an inter-symbol interference effect. In the OFDM, a data symbol input in series is converted into N parallel data symbols, which are transmitted with the N parallel data symbols being loaded on N divided subcarriers, respectively. The subcarriers maintain orthogonality in terms of a frequency. Respective orthogonal channels go through inter-dependent frequency selective fading, and as a result, complexity is reduced at a receiver and an interval of the transmitted symbols is lengthened, thereby minimizing inter-symbol interference. However, the OFDM system is very sensitive to the frequency offset. The frequency offset may occur by inconsistency in frequency of an oscillator between a transmitter and a receiver or a Doppler effect. The orthogonality among the subcarriers may be broken and interference may occur due to the frequency offset, and as a result, demodulation performance is reduced. This problem is commonly raised in all communication systems using the OFDM technique, which includes an OFDM-based cognitive radio (CR) system.

In order to estimate the frequency offset of the OFDM system, various frequency offset estimating methods have been proposed. First, a frequency offset estimating method based on two repeated OFDM signals and a maximum likelihood theory may be proposed. However, this method has a disadvantage that an estimate range of the frequency offset is too small. T. M. Schmidl and D. C. Cox, "Robust frequency and timing synchronization for OFDM," IEEE Trans. Commun, vol. 45, no. 12, pp. 1613-1621, December 1997 proposes a method of estimating the frequency offset by using a training symbol having a repeated structure in one OFDM signal and a training symbol configured by a pseudo noise code. The method of estimating the frequency offset by using the training symbol is excellent in estimation performance of the frequency offset, but has a disadvantage that the frequency offset can be estimated only when the OFDM signal is configured by a specified training symbol. J.-J. van de Beek, M. Sandell, and P. O. Borjesson, "ML estimation of time and frequency offset in OFDM systems," IEEE Trans. Sig. Process., vol. 45, no. 7, pp. 1800-1805, July 1997 proposes a blind-based frequency offset estimating method, but is not excellent in estimation performance of the frequency offset.

As a result, a method of estimating the frequency offset based on a periodogram may be proposed. The method of estimating the frequency offset based on the periodogram provides a frequency offset estimating method which can be applied to a predetermined training symbol based on the envelope equalized processing (EEP) and the periodogram.

However, the existing proposed method of estimating the frequency offset based on the periodogram is too high in amount of computation. As a result, a frequency offset estimating method capable of lowering the amount of computation and complexity while using the periodogram needs to be proposed.

SUMMARY OF THE INVENTION

The present invention provides a method and an apparatus of estimating a frequency offset based on a partial periodogram in a wireless communication system. In particular, the present invention proposes a method and an apparatus of estimating the frequency offset having the amount of computation and complexity which are low by estimating the frequency offset by means of a partial periodogram.

In an aspect, a method of estimating a frequency offset in a wireless communication system is provided. The method includes performing envelope equalized processing (EEP) for a reception signal, calculating partial periodograms for a plurality of test values based on the reception signal which goes through the EEP, estimating a first frequency offset based on two partial periodograms adjacent to each other among the partial periodograms for the plurality of test values, estimating a second frequency offset based on the estimated first frequency offset and two partial periodograms adjacent to each other based on the estimated first frequency offset, repeatedly estimating a third frequency offset based on the estimated first frequency offset, the estimated second frequency offset, and two partial periodograms adjacent to each other based on the estimated first frequency offset and the estimated second frequency offset, and estimating a final frequency offset by adding the estimated first frequency offset, the estimated second frequency offset, and the estimated third frequency offset.

The partial periodograms may be calculated by the following equation $$I_\alpha(z) = \sum_{k=0}^{\alpha-1} \left| \sum_{m=Nk/\alpha}^{N(k+1)/\alpha-1} y_m e^{-j2\pi zm/N} \right|^2,$$

where α denotes an interval among the plurality of test values, N denotes a length of discrete Fourier transform (DFT), and $y_m$ denotes the reception signal which goes through the EEP.

α may be smaller than N and may be one of integers which are the power of 2.

the first frequency offset may be estimated as a test value when the sum of two adjacent partial periodograms among the partial periodograms for the plurality of test values has the maximum value.

The first frequency offset may be estimated by the following equation $$\hat{\epsilon}_I = \underset{\tilde{\epsilon}_I}{\mathrm{argmax}}\{I_\alpha(\tilde{\epsilon}_I) + I_\alpha(\tilde{\epsilon}_I + \alpha)\},$$

where $I_\alpha(\tilde{\epsilon}_I)$ denotes the partial periodograms for the test values and $I_\alpha(\tilde{\epsilon}_I+\alpha)$ denotes a partial periodogram adjacent to $I_\alpha(\tilde{\epsilon}_I)$.

The second frequency offset may be estimated by the following equation $$\hat{\epsilon}_F = \frac{\alpha\sqrt{I_\alpha(\hat{\epsilon}_I + \alpha)}}{\sqrt{I_\alpha(\hat{\epsilon}_I)} + \sqrt{I_\alpha(\hat{\epsilon}_I + \alpha)}},$$

where $I_\alpha(\hat{\epsilon}_I)$ denotes the partial periodogram for the estimated first frequency offset and $I_\alpha(\hat{\epsilon}_I+\alpha)$ denotes the partial periodogram adjacent to $I_\alpha(\hat{\epsilon}_I)$.

The third frequency offset may be estimated by repeatedly computing the following equation $$\epsilon_{T+1} = \frac{\alpha\left\{\sqrt{I_\alpha(\hat{\epsilon}_I + \hat{\epsilon}_F + \epsilon_T + \alpha/2)} - \sqrt{I_\alpha(\hat{\epsilon}_I + \hat{\epsilon}_F + \epsilon_T + \alpha/2)}\right\}}{2\left\{\sqrt{I_\alpha(\hat{\epsilon}_I + \hat{\epsilon}_F + \epsilon_T + \alpha/2)} + \sqrt{I_\alpha(\hat{\epsilon}_I + \hat{\epsilon}_F + \epsilon_T + \alpha/2)}\right\}}$$

The equation may be computed repeatedly at $\log_2 \alpha$ times, and $\alpha$ may be substituted with $\alpha/2$ whenever the equation is computed repeatedly.

The EEP may be performed by multiplying the reception signal with a complex conjugate of a training symbol and dividing the multiplication value by power of the training symbol.

In another aspect, an orthogonal frequency division multiplexing (OFDM) receiver in a wireless communication system is provided. The OFDM receiver includes a radio frequency (RF) unit configured to transmit or receive a radio signal, and a process, operatively connected to the RF unit, and configured for performing envelope equalized processing (EEP) for a reception signal, calculating a partial periodogram for a plurality of test values based on the reception signal which goes through the EEP, estimating a first frequency offset based on two partial periodograms adjacent to each other among the partial periodograms for the plurality of test values, estimating a second frequency offset based on the estimated first frequency offset and two partial periodograms adjacent to each other based on the estimated first frequency offset, repeatedly estimating a third frequency offset based on the estimated first frequency offset, the estimated second frequency offset, and two partial periodograms adjacent to each other based on the estimated first frequency offset and the estimated second frequency offset, and estimating a final frequency offset by adding the estimated first frequency offset, the estimated second frequency offset, and the estimated third frequency offset.

In another aspect, a method of receiving an orthogonal frequency division multiplexing (OFDM) signal in a wireless communication system is provided. The method includes adjusting frequency synchronization of an OFDM reception signal, converting the OFDM reception signal in which the time and the frequency are synchronized into a parallel signal, performing fast Fourier transform (FFT) for the parallel signal, and performing decoding and de-interleaving for the parallel signal which goes through the FFT, wherein the adjusting of the frequency synchronization of the OFDM reception signal includes performing envelope equalized processing (EEP) for the OFDM reception signal, calculating a partial periodogram for a plurality of test values based on the reception signal which goes through the EEP, estimating a first frequency offset based on two partial periodograms adjacent to each other among the partial periodograms for the plurality of test values, estimating a second frequency offset based on the estimated first frequency offset and two partial periodograms adjacent to each other based on the estimated first frequency offset, repeatedly estimating a third frequency offset based on the estimated first frequency offset, the estimated second frequency offset, and two partial periodograms adjacent to each other based on the estimated first frequency offset and the estimated second frequency offset, and estimating a final frequency offset by adding the estimated first frequency offset, the estimated second frequency offset, and the estimated third frequency offset.

In another aspect, an apparatus of receiving an orthogonal frequency division multiplexing (OFDM) signal in a wireless communication system is provided. The apparatus includes a synchronization block for adjusting frequency synchronization of an OFDM reception signal, a serial/parallel converter for converting the OFDM reception signal in which the time and the frequency are synchronized into a parallel signal, an FFT block for performing fast Fourier transform (FFT) for the parallel signal, and a decoding/de-interleaving block for performing decoding and de-interleaving for the parallel signal which goes through the FFT, wherein the synchronization block is configured for performing envelope equalized processing (EEP) for the OFDM reception signal, calculating a partial periodogram for a plurality of test values based on the reception signal which goes through the EEP, estimating a first frequency offset based on two partial periodograms adjacent to each other among the partial periodograms for the plurality of test values, estimating a second frequency offset based on the estimated first frequency offset and two partial periodograms adjacent to each other based on the estimated first frequency offset, repeatedly estimating a third frequency offset based on the estimated first frequency offset, the estimated second frequency offset, and two partial periodograms adjacent to each other based on the estimated first frequency offset and the estimated second frequency offset, and estimating a final frequency offset by adding the estimated first frequency offset, the estimated second frequency offset, and the estimated third frequency offset.

DESCRIPTION OF EXEMPLARY EMBODIMENTS

Figure 1:
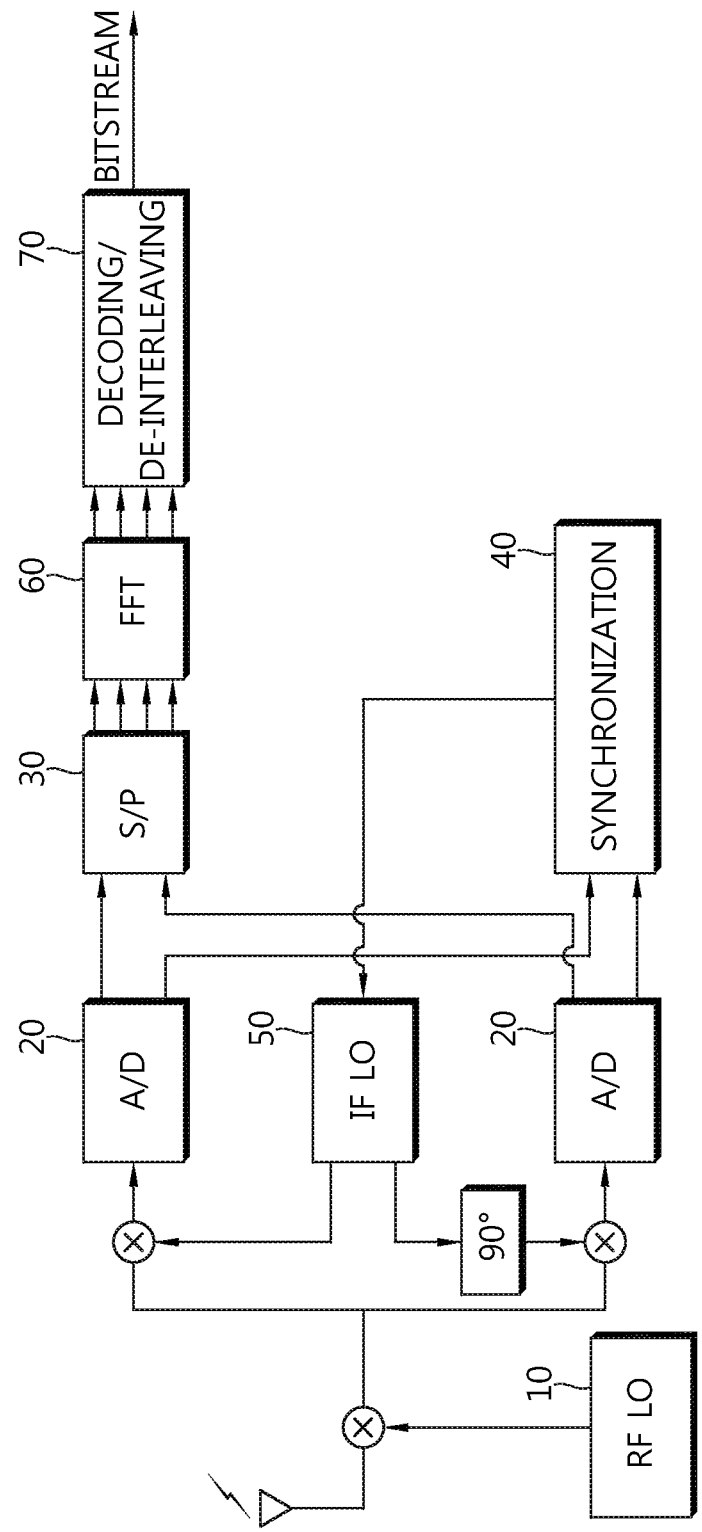
FIG. 1 is a block diagram of a general OFDM receiver.

Hereinafter, exemplary embodiments of the present invention will be described in detail so that those skilled in the art easily implement the exemplary embodiments with reference to the accompanying drawings. However, the present invention may be implemented in various different forms and is not limited to the exemplary embodiments described herein.

Parts which are not associated with the description are omitted in order to specifically describe the present invention in the drawings and like reference numerals refer to like elements throughout the specification. Further, although the detailed description is omitted, parts which can easily be understood by those skilled in the art is not described.

Through the specification and the appended claims, when a predetermined part "includes" a predetermined component, other components are not excluded but other components may be further included in the predetermined part.

FIG. 1 is a block diagram of a general OFDM receiver.

Referring to FIG. 1, the general OFDM receiver includes a radio frequency local oscillator (RF LO) 10, an analog/digital converter (A/D) 20, a serial/parallel converter (S/P) 30, a synchronization block 40, an intermediate frequency local oscillator (IF LO) 50, a fast Fourier transform (FFT) block 60, and a decoding/de-interleaving block 70. A reception signal is input into the S/P 30 and the synchronization block 40 through the A/D 20 and an output of the synchronization block 40 is fed back to the IF LO 50 and input into the A/D 20 again. The synchronization block 40 synchronizes a time and a frequency. The reception signal passing through the S/P 30 passes though the FFT block 60 and is output through the decoding/de-interleaving block 70. The frequency offset estimating method to be described below may be performed by the synchronization block 40 in the block diagram of the OFDM receiver of FIG. 1. That is, the performance of the synchronization block 40 of the OFDM receiver may be performed by the proposed frequency offset estimating method.

Hereinafter, a method of estimating the frequency offset based on a periodogram of the present invention will be described.

A bitstream is modulated by a phase shift keying (PSK) or quadrature amplitude modulation (QAM) scheme, and as a result, a data symbol is generated. Inverse fast Fourier transform (IFFT) is performed with respect to the generated data symbol, and as a result, an OFDM signal is generated in a time domain. The generated OFDM signal may be expressed by Equation 1.

$$x_n = \frac{1}{\sqrt{N}} \sum_{k=0}^{N-1} X_k e^{j2\pi nk/N}, \text{ for } n = 0, 1, \ldots, N-1 \quad <\text{Equation 1}>$$

In Equation 1, N represents the magnitude of the IFFT and $X_n$ represents an n-th data symbol modulated in the PSK or QAM scheme.

In a transmitter, a guard interval (GI) longer than a maximum delay time of the channel may be inserted between the OFDM signals. This is to remove interference between the OFDM signals, which may occur due to the channel. In this case, the guard interval may be inserted in a cyclic prefix (CP) form of the same form as a latter part of the OFDM signal, in order to assure orthogonality between subcarriers. When time synchronization is perfectly performed, a k-th sample of the signal received through the channel may be expressed by Equation 2.

$$y_n = \sum_{l=0}^{L-1} h_l x_{n-l} e^{j2\pi n\epsilon/N} + w_n, \text{ for } n = 0, 1, \ldots, N-1 \quad <\text{Equation 2}>$$

In Equation 2, $h_l$ represents a l-th complex impulse response coefficient of a channel having a length of L and $\epsilon$ represents a frequency offset normalized at a subcarrier interval. $w_n$ represents complex additive white Gaussian noise (AWGN) having an average of 0 and a distribution of $\sigma_w^2$. A signal-to-noise ratio (SNR) may be defined as $\sigma_s^2/\sigma_w^2$ and $\sigma_s^2 = E\{|x_n|_2\}$.

A receiver may perform envelope equalized processing (EEP) with respect to the reception signal. The EEP may equalize amplitudes of all the reception signals. The EEP may be defined by Equation 3.

$$f_n = \frac{x_n^*}{|x_n|^2} \quad <\text{Equation 3}>$$

In Equation 3, $x_n^*$ represents a complex conjugate of a conjugate $x_n$. The reception signal that goes through the EEP may be expressed by Equation 4.

$$y'_n = y_n f_n \quad <\text{Equation 4}>$$
$$= h_0 x_n e^{j2\pi\epsilon n/N} f_n + \sum_{l=1}^{L-1} h_l x_{n-l} e^{j2\pi\epsilon n/N} f_n + w_n f_n$$
$$= h_0 e^{j2\pi\epsilon n/N} + w'_n,$$

In Equation 4, $w_n'$ may be approximated to probability variables of a normal distribution having an average of 0 by a central limit theorem (CLM). The reception signal may be changed to a simple complex tone signal by the EEP.

The frequency offset estimating method of the present invention may be performed dividedly in 3 steps. That is, a frequency offset to be estimated, $\epsilon = \epsilon_I + \epsilon_F + \epsilon_R$, is constituted by a first frequency offset $\epsilon_I$, a second frequency offset $\epsilon_F$, and a third frequency offset $\epsilon_R$, ands may be acquired by estimating $\epsilon_I$, $\epsilon_F$, and $\epsilon_R$ for each step.

First, the first frequency offset $\epsilon_I$ is estimated. The $\epsilon_I$ may be estimated by Equation 5.

$$\hat{\epsilon}_I = \underset{\tilde{\epsilon}_I}{\operatorname{argmax}} \{I(\tilde{\epsilon}_I) + I(\tilde{\epsilon}_I + 1)\} \quad <\text{Equation 5}>$$

In Equation 5, $$\tilde{\epsilon}_I \in \left\{-\frac{N}{2}, \ldots, 0, \ldots, \frac{N}{2}1\right\}$$

is a test value for finding $\hat{\epsilon}_I$ which is an estimation value of the first frequency offset. A periodogram I(z) may be expressed by Equation 6.

$$I(z) = \left|\sum_{n=0}^{N-1} y_n e^{-j2\pi zn/N}\right|^2 \quad <\text{Equation 6}>$$

In Equation 5, since an interval of $\tilde{\epsilon}_I$ is defined as 1, the first frequency offset $\epsilon_I$ is acquired by estimating an integer part in the frequency offset $\epsilon$. Therefore, the second frequency offset $\epsilon_F$ and the third frequency offset $\epsilon_R$ are acquired by estimating a decimal part in the frequency offset $\epsilon$.

Meanwhile, when the frequency offset of the integer part is estimated by Equations 5 and 6, all integer values of the frequency offset need to be examined. Therefore, the amount of computation increases and complexity of the receiver increases. In order to solve these problems, the first frequency offset $\epsilon_I$ may be estimated by using the partial periodogram, $$I_\alpha(z) = \sum_{k=0}^{\alpha-1} \left| \sum_{m=Nk/\alpha}^{N(k+1)/\alpha-1} y_m e^{-j2\pi zm/N} \right|^2.$$

When the partial periodogram is used, $\epsilon_I$ may be estimated by Equation 7.

$$\hat{\epsilon}_I = \underset{\tilde{\epsilon}_I}{\operatorname{argmax}}\{I_\alpha(\tilde{\epsilon}_I) + I_\alpha(\tilde{\epsilon}_I + \alpha)\} \qquad <\text{Equation 7}>$$

In Equation 7, $$\tilde{\epsilon}_I \in \left\{ -\frac{N}{2}, -\frac{N}{2}+\alpha \ldots, 0, \ldots, \frac{N}{2}-\alpha \right\}$$

and the interval of $\tilde{\epsilon}_I$ is not 1 but $\alpha$. $\alpha$ may be the power of 2 that is smaller than N. Therefore, the number of examination times may be decreased depending on $\alpha$ which is set.

Meanwhile, when there is no noise, Equation 7 has the large value at $\tilde{\epsilon}_I$ in the range of $\epsilon-\alpha<\tilde{\epsilon}_I\le\epsilon$. Therefore, the second frequency offset $\epsilon_F$ may be estimated in the range of $0\le\epsilon_F\le\alpha$.

When a single-path channel without noise is assumed, $I_\alpha(\epsilon_I)$ and $I_\alpha(\epsilon_I+\alpha)$ may be approximated by Taylor series as illustrated in Equations 8 and 9.

$$I_\alpha(\epsilon_I) \approx \frac{N^2|h_0|^2}{\alpha^2}\operatorname{sinc}^2\left(\frac{\epsilon-\epsilon_I}{\alpha}\right) \qquad <\text{Equation 8}>$$

$$I_\alpha(\epsilon_I+\alpha) \approx \frac{N^2|h_0|^2}{\alpha^2}\operatorname{sinc}^2\left(\frac{\epsilon-\epsilon_I-\alpha}{\alpha}\right) \qquad <\text{Equation 9}>$$

Herein, $\sin c(x)=\sin(\pi x)/\pi x$. The relationship of Equation 10 may be deduced from Equations 8 and 9.

$$\frac{\sqrt{I_\alpha(\epsilon_I+\alpha)}}{\sqrt{I_\alpha(\epsilon_I)}} = \frac{|\operatorname{sinc}\{(\epsilon-\epsilon_I-\alpha)/\alpha\}|}{|\operatorname{sinc}\{(\epsilon-\epsilon_I)/\alpha\}|} = \qquad <\text{Equation 10}>$$

$$\frac{|\epsilon-\epsilon_I|}{|\epsilon-\epsilon_I-\alpha|}\frac{|\sin\{(\epsilon-\epsilon_I-\alpha)/\alpha\}|}{|\sin\{(\epsilon-\epsilon_I)/\alpha\}|} = \frac{|\epsilon-\epsilon_I|}{|\epsilon-\epsilon_I-\alpha|},$$

In this case, since $\epsilon-\epsilon_I=\epsilon_F$, Equation 10 may be expressed as Equation 11 again if $0\le\epsilon_F\le\alpha$.

$$\frac{\sqrt{I_\alpha(\epsilon_I+\alpha)}}{\sqrt{I_\alpha(\epsilon_I)}} = \frac{\epsilon_F}{-\epsilon_F+\alpha} \qquad <\text{Equation 11}>$$

The second frequency offset $\epsilon_F$ may be estimated by Equation 12 based on Equation 11.

$$\hat{\epsilon}_F = \frac{\alpha\sqrt{I_\alpha(\hat{\epsilon}_I+\alpha)}}{\sqrt{I_\alpha(\hat{\epsilon}_I)}+\sqrt{I_\alpha(\hat{\epsilon}_I+\alpha)}} \qquad <\text{Equation 12}>$$

Meanwhile, when $\epsilon_F$ is close to 0 or $\alpha$ in Equation 12, the SNR of any one of $I_\alpha(\hat{\epsilon}_I)$ and $I_\alpha(\hat{\epsilon}_I+\alpha)$ decreases, and as a result, the estimation performance of $\epsilon_F$ by Equation 12 deteriorates and the remaining frequency offsets need to be additionally estimated. In this case, $I_\alpha(\hat{\epsilon}_I+\hat{\epsilon}_F+\alpha/2)$ and $I_\alpha(\hat{\epsilon}_I+\hat{\epsilon}_F-\alpha/2)$ using the estimation values of $\epsilon_I$ and $\epsilon_F$ may have SNRs of an appropriate level which are not too low and the relationship of Equation 13 may be deduced by using the same.

$$\frac{\sqrt{I_\alpha(\hat{\epsilon}_I+\hat{\epsilon}_F+\alpha/2)} - \sqrt{I_\alpha(\hat{\epsilon}_I+\hat{\epsilon}_F-\alpha/2)}}{\sqrt{I_\alpha(\hat{\epsilon}_I+\hat{\epsilon}_F+\alpha/2)} + \sqrt{I_\alpha(\hat{\epsilon}_I+\hat{\epsilon}_F-\alpha/2)}} = \qquad <\text{Equation 13}>$$

$$\frac{|1/(\epsilon_R-\alpha/2)|-|1/(\epsilon_R+\alpha/2)|}{|1/(\epsilon_R-\alpha/2)|+|1/(\epsilon_R+\alpha/2)|}$$

In Equation 13, $\epsilon_R=\epsilon-\hat{\epsilon}_I-\hat{\epsilon}_F$ and Equation 13 becomes $2\epsilon_R/\alpha$ in the range of $-\alpha/2<\epsilon_R<\alpha/2$. The third frequency offset $\epsilon_R$ may be estimated based on Equation 14 by using the same.

$$\epsilon_{T+1} = \frac{\alpha\left\{\sqrt{I_\alpha(\hat{\epsilon}_I+\hat{\epsilon}_F+\epsilon_T+\alpha/2)} - \sqrt{I_\alpha(\hat{\epsilon}_I+\hat{\epsilon}_F+\epsilon_T+\alpha/2)}\right\}}{2\left\{\sqrt{I_\alpha(\hat{\epsilon}_I+\hat{\epsilon}_F+\epsilon_T+\alpha/2)} + I_\alpha(\hat{\epsilon}_I+\hat{\epsilon}_F+\epsilon_T+\alpha/2)\right\}} \qquad <\text{Equation 14}>$$

In Equation 14, first, $\epsilon_{T+1}$ is acquired by setting an initial value as $\epsilon_T=0$. New $\epsilon_{T+1}$ is acquired by substituting $\epsilon_T$ with $\epsilon_{T+1}$ acquired above and $\alpha$ with $\alpha/2$. Such computation is repeated until $\alpha=1$. $\epsilon_{T+1}$ which is finally acquired becomes the estimation value of the third frequency offset $\epsilon_R$. In this case, since the number of repetition times of the computation of Equation 14 increases as a increases, the total amount of computation may increase, but the amount of computation decreases very significantly while a decreases to a half, and as a result, the total amount of computation makes no odds.

A total frequency offset may be estimated by adding all the estimation values of the first frequency offset $\epsilon_I$, the second frequency offset $\epsilon_F$, and the third frequency offset $\epsilon_R$.

Figure 2:
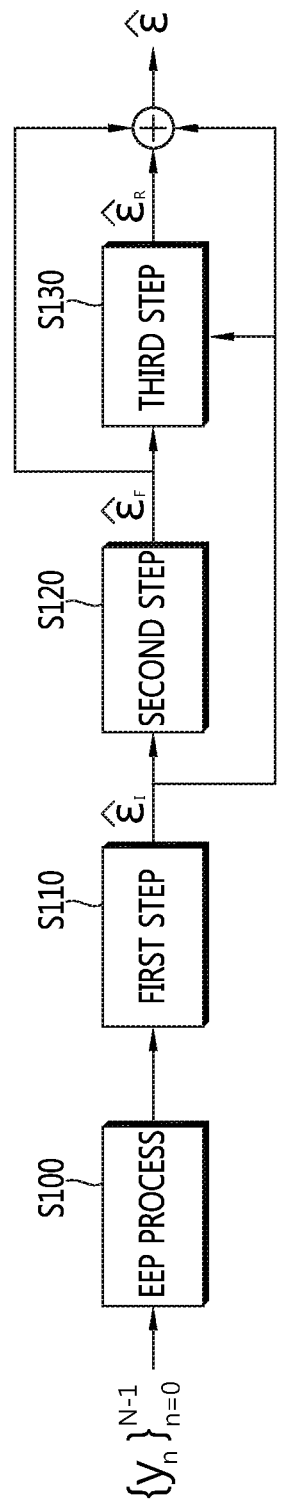
FIG. 2 illustrates an exemplary embodiment of a proposed method of estimating a frequency offset.

FIG. 2 illustrates an exemplary embodiment of a proposed method of estimating a frequency offset.

In step S100, the OFDM receiver performs the EEP with respect to the reception signal. In step S110 (first step), the OFDM receiver estimates the first frequency offset $\epsilon_I$ based on Equation 7 with respect to the reception signal which goes through the EEP. In step S120 (second step), the OFDM receiver estimates the second frequency offset $\epsilon_F$ based on Equation 12 by using the partial periodogram used to acquire the estimation value of $\epsilon_I$. In step S130 (third step), the OFDM receiver estimates the third frequency offset $\epsilon_R$ based on the estimation value of $\epsilon_I$, the estimation value of $\epsilon_F$, and Equation 14. An estimation value of a final frequency offset may be acquired by adding all the estimation values of the first frequency offset, the second frequency offset, and the third frequency offset.

Figure 3:
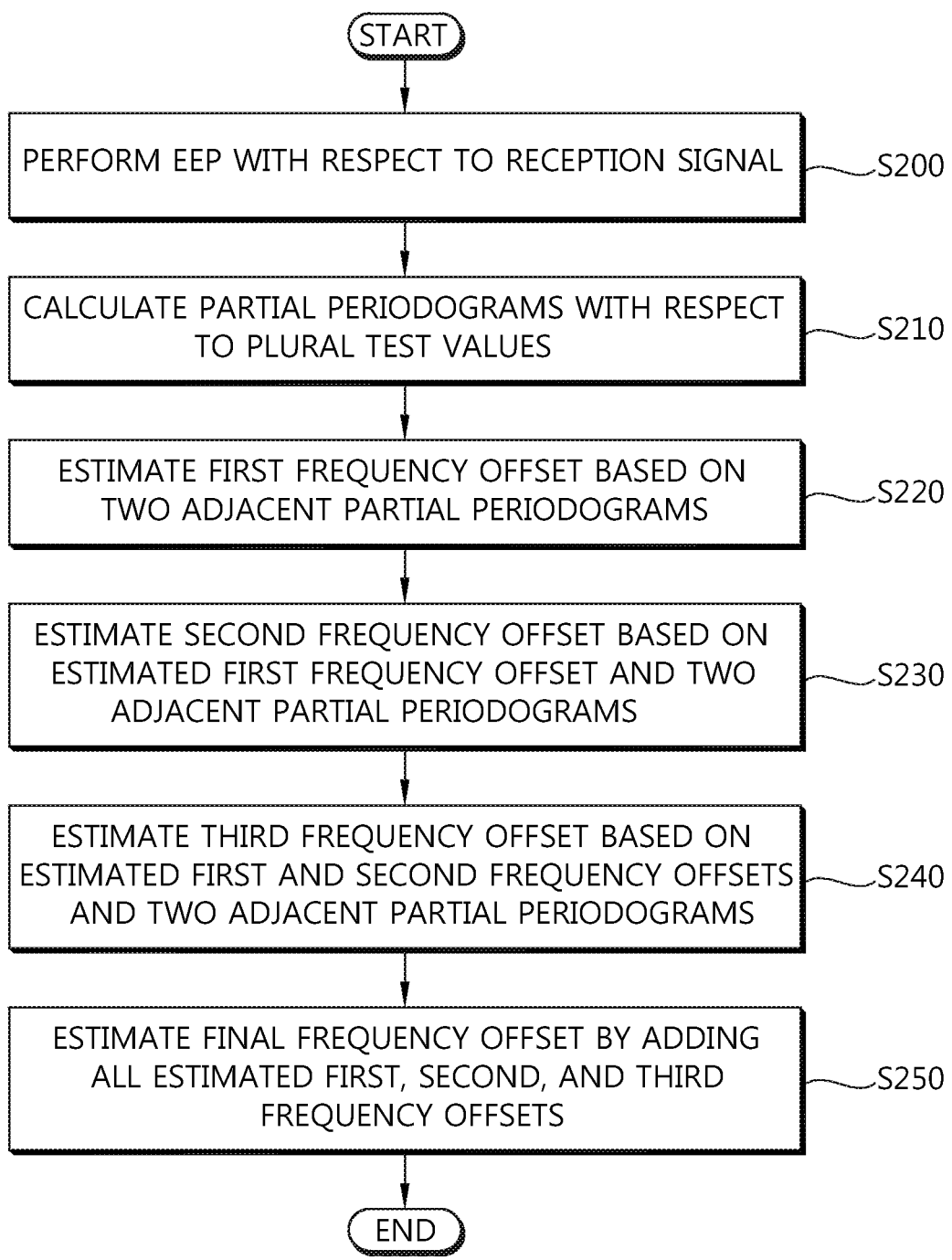
FIG. 3 illustrates another exemplary embodiment of a proposed method of estimating a frequency offset.

FIG. 3 illustrates another exemplary embodiment of a proposed method of estimating a frequency offset.

In step S200, the OFDM receiver performs the EEP with respect to the reception signal. In step S210, the OFDM receiver calculates the partial periodograms for a plurality of test values based on the reception signal which goes through the EEP. In step S220, the OFDM receiver estimates the first frequency offset based on two partial periodograms adjacent to each other among the partial periodograms for the plurality of test values. In this case, Equation 7 may be used. In step S230, the OFDM receiver estimates the second frequency offset based on the estimated first frequency offset and two partial periodograms adjacent to each other based on the estimated first frequency offset. In this case, Equation 12 may be used. In step S240, the OFDM receiver repeatedly estimates the third frequency offset based on the estimated first frequency offset, the estimated second frequency offset, and two partial periodograms adjacent to each other based on the estimated first frequency offset and the estimated second frequency offset. In this case, Equation 14 may be used. In step S250, the OFDM receiver estimates the final frequency offset by adding the estimated first frequency offset, the estimated second frequency offset, and the estimated third frequency offset.

Table 1 illustrates the amount of computation required in each of the steps of estimating the first frequency offset, the second frequency offset, and the third frequency offset. Since the multiplication of conjugates may be expressed by the multiplication of four real numbers and the sum of two real numbers and the sum of conjugates may be expressed by the sum of two real numbers, the total amount of computation may be acquired according to the amount of computation when the multiplication of the real numbers is calculated and the amount of computation when the sum of the real numbers is calculated.

TABLE 1

| | Multiplication of real numbers | Sum of real numbers |
|---|---|---|
| EEP | $4N$ | $2N$ |
| First step | $\dfrac{4N}{\alpha}(N+\alpha)$ | $\dfrac{N}{\alpha}(4N+\alpha)$ |
| Second step | $2$ | $1$ |
| Third step | $(\log_2(\alpha+1))(8N+3) + \dfrac{4}{\alpha}\left(1 - \dfrac{1}{2^{\log_2(\alpha+1)}}\right)$ | $(\log_2(\alpha+1))(8N+1) + 4\alpha\left(1 - \dfrac{1}{2^{\log_2(\alpha|1)}}\right)$ |

Figure 4:
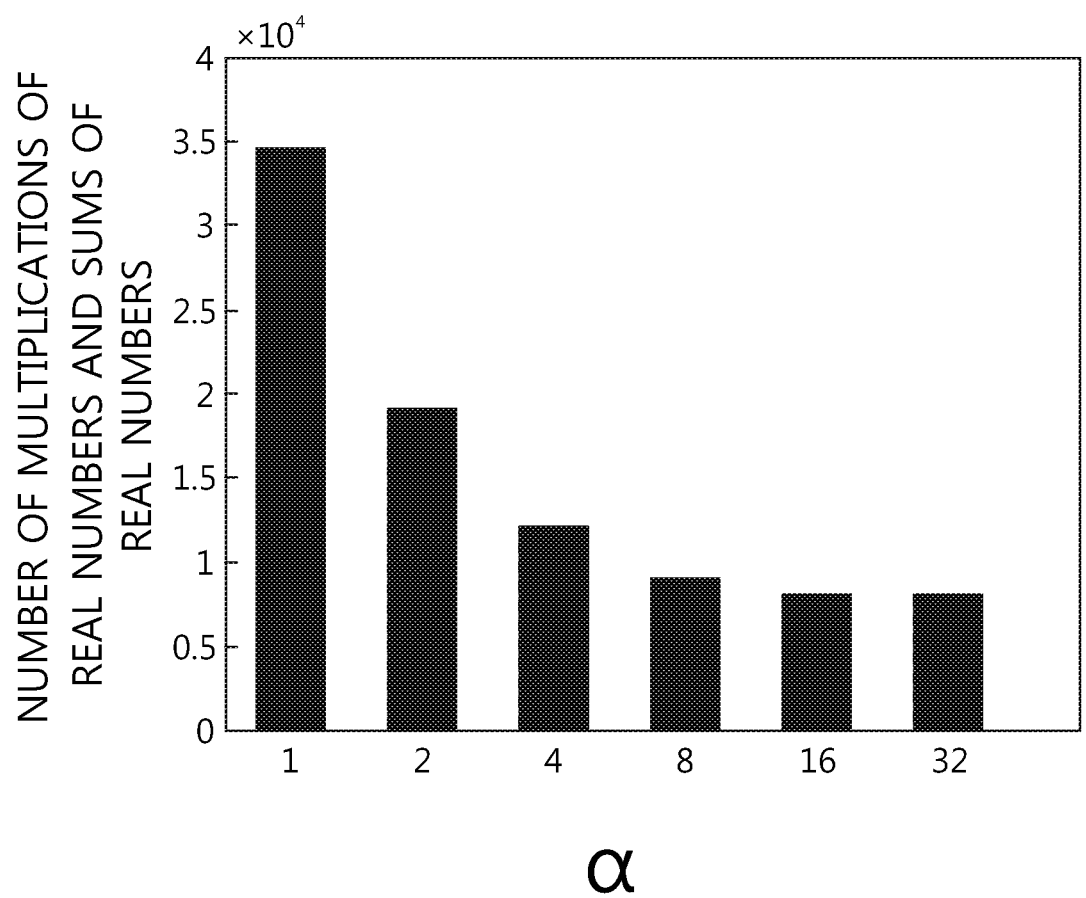
FIG. 4 illustrates a difference in the amount of computation depending on variation of a when the proposed frequency offset estimating method is applied.

FIG. 4 illustrates a difference in the amount of computation depending on variation of α when the proposed frequency offset estimating method is applied. FIG. 4 illustrates a difference in the amount of computation depending on the variation of α when N=64. In general, it can be seen that the amount of computation decreases as α increases. However, the amount of computation increases slightly when α=32 as compared with α=16. The reason is that the larger amount of computation is increased by repeating the third step than the amount of computation which decreases in the first step.

Figure 5:
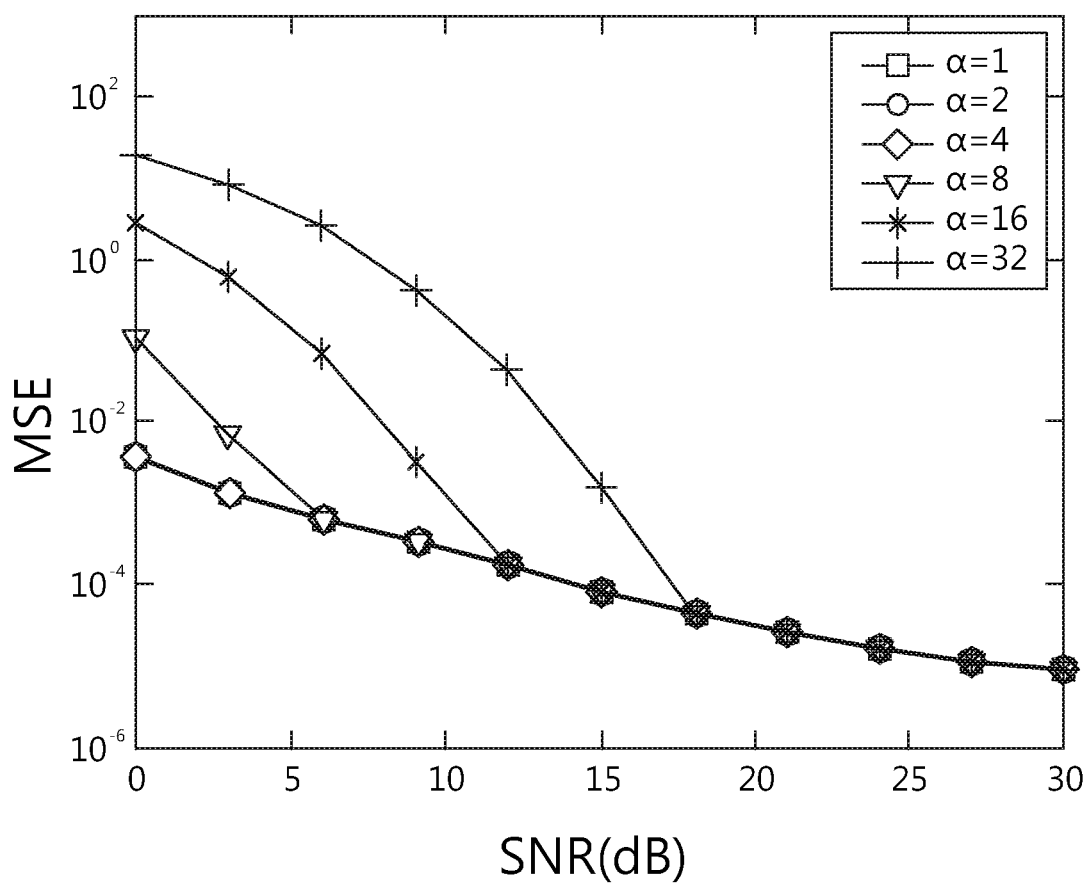
FIGS. 5 and 6 are graphs illustrating the performance of the proposed frequency offset estimating method.
Figure 6:
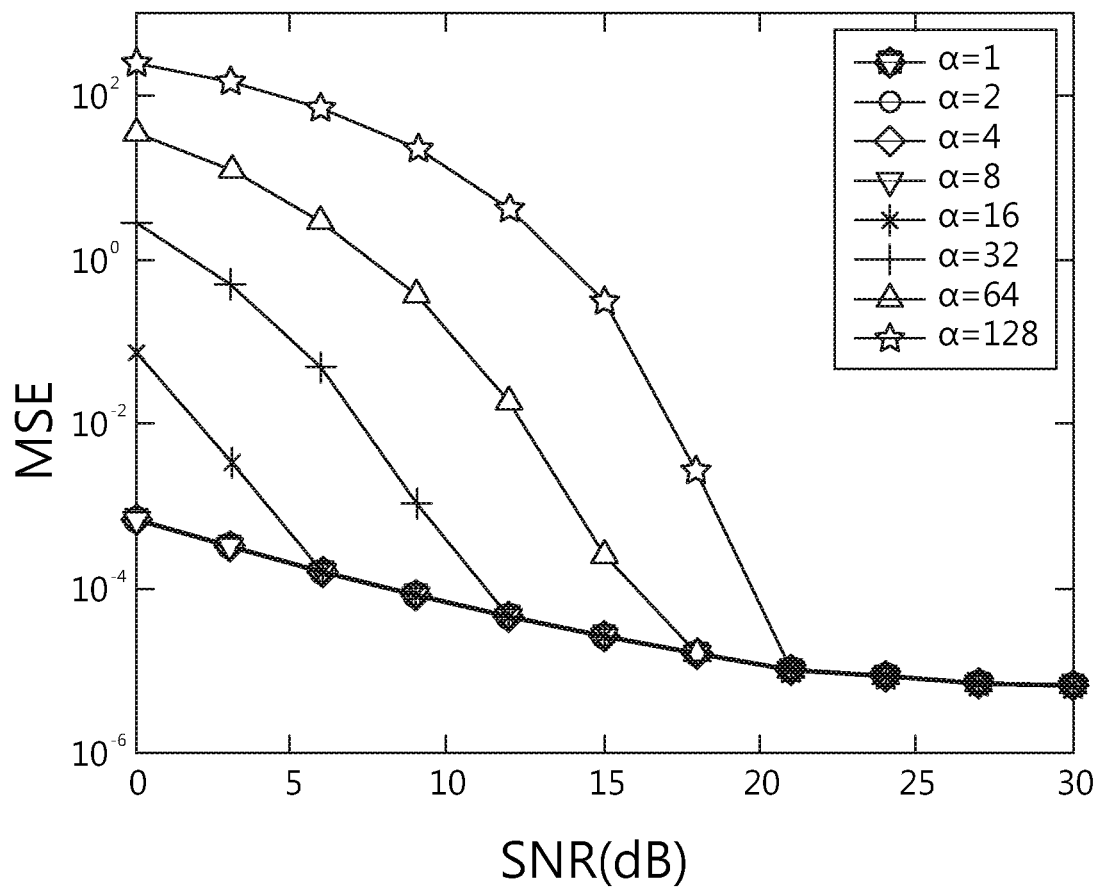

FIGS. 5 and 6 are graphs illustrating the performance of the proposed frequency offset estimating method.

FIG. 5 illustrates mean square error (MSE) performance of the proposed frequency offset estimating method depending on α when a training symbol of an institute of electrical and electronics engineers (IEEE) 802.11a standard is used. FIG. 6 illustrates MSE performance of the proposed frequency offset estimating method depending on α when a training symbol of an IEEE 802.16-2004 standard is used. Ns in FIGS. 5 and 6 are 64 and 256, respectively. As a channel model, a 4-path Rayleigh fading channel is used, each channel response has a time delay of 0, 2, 4, or 6 sample in the Rayleigh fading channel, power of an 1-th impulse response of the channel, $h_l^2$ is exponentially decreased as l increases like $E\{h_l^2\}=\exp(-0.8l)$. A Doppler bandwidth is set to 0.0017, which corresponds to a case in which a movement velocity is 120 km/h.

Referring to FIGS. 5 and 6, in general, the MSE performance decreases as α increases. The reason is that since the value of the partial periodogram is configured by adding α values which go through computation of an absolute value, the amount of noise increases as α increases. However, the MSE performance does not significantly decrease until α=4 in FIG. 5 and α=8 in FIG. 6. Although α increases, when the SNR is 18 dB or more in FIG. 5 and the SNR is 21 dB or more in FIG. 6, the MSE performance does not decrease. Therefore, in the IEEE 802.11a system of FIG. 5, the frequency offset may be estimated with optimal performance when α=4 and in the IEEE 802.16-2004 system of FIG. 6, the frequency offset may be estimated with optimal performance when α=8. When the SNR is known, the frequency offset estimating method with reliability may be acquired while the amount of computation decreases by selecting α according to the SNR.

Figure 7:
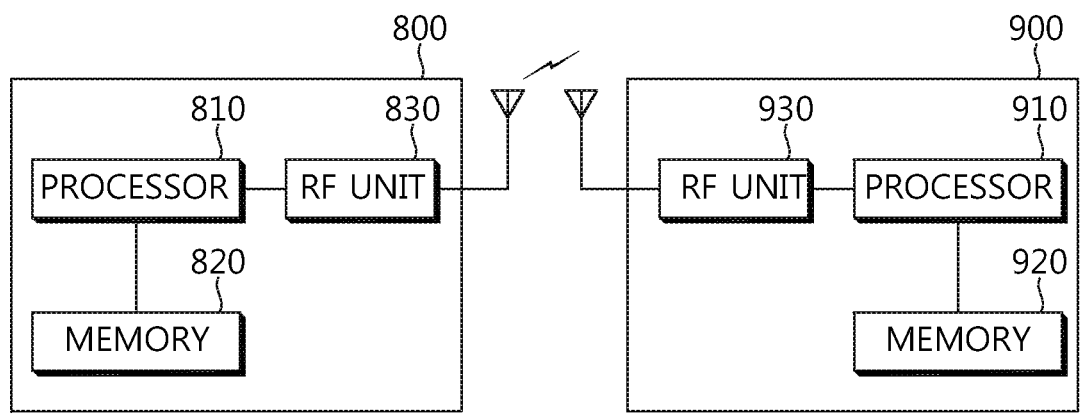
FIG. 7 is a block diagram of a wireless communication system in which the exemplary embodiment of the present invention is implemented.

FIG. 7 is a block diagram of a wireless communication system in which the exemplary embodiment of the present invention is implemented.

A transmitter 800 includes a processor 810, a memory 820, and a radio frequency (RF) unit 830. The processor 810 implements the proposed functions, processes, and/or methods. Layers of radio interface protocols may be implemented by the processor 810. The memory 820 is connected with the processor 810 to store various information for driving the processor 810. The RF unit 830 is connected with the processor 810 to transmit and/or receive a radio signal.

A receiver 900 includes a processor 910, a memory 920, and an RF unit 930. The processor 910 implements the proposed functions, processes, and/or methods. The layers of the radio interface protocols may be implemented by the processor 910. The memory 920 is connected with the processor 910 to store various information for driving the processor 910. The RF unit 930 is connected with the processor 910 to transmit and/or receive the radio signal.

The processors 810 and 910 may include an application-specific integrated circuit (ASIC), other chipsets, a logic circuit, and/or a data processing device. The memories 820 and 920 may include a read-only memory (ROM), a random access memory (RAM), a flash memory, a memory card, a storage medium and/or other storage devices. The RF units 830 and 930 may include a baseband circuit for processing the radio signal. When the exemplary embodiment is implemented by software, the above-mentioned technique may be implemented by modules (a process and a function) performing the above-mentioned functions. The module is stored in the memories 820 and 920 and may be executed by the processor 810 and 910. The memories 820 and 920 may be provided inside or outside the processors 810 and 910 and may be connected with the processor 810 and 910 by various well-known means.

The frequency offset may be estimated with excellent performance under various noise environments by the proposed frequency offset estimating method.

According to the exemplary embodiments of the present invention, the frequency offset can be estimated with reliability while lowering the amount of computation by using the partial periodogram.

In the aforementioned exemplary system, the methods are described based on a flowchart as a series steps or blocks, but the present invention is not limited to the order of the steps and a predetermined step may be performed in the different order from and at the same time as other steps. Further, it may be appreciated by those skilled in the art that steps shown in a flow chart is non-exclusive and therefore, include other steps or deletes one or more steps of a flowchart without having an effect on the scope of the present invention.

What is claimed is:

1. A method of estimating a frequency offset in a wireless communication system, the method comprising:
   performing envelope equalized processing (EEP) for a reception signal;
   calculating partial periodograms for a plurality of test values based on the reception signal which goes through the EEP;
   estimating a first frequency offset based on two partial periodograms adjacent to each other among the partial periodograms for the plurality of test values;
   estimating a second frequency offset based on the estimated first frequency offset and two partial periodograms adjacent to each other based on the estimated first frequency offset;
   repeatedly estimating a third frequency offset based on the estimated first frequency offset, the estimated second frequency offset, and two partial periodograms adjacent to each other based on the estimated first frequency offset and the estimated second frequency offset; and
   estimating a final frequency offset by adding the estimated first frequency offset, the estimated second frequency offset, and the estimated third frequency offset.

2. The method of claim 1, wherein:
   the partial periodograms are calculated by the following equation, $$I_\alpha(z) = \sum_{k=0}^{\alpha-1} \left| \sum_{m=Nk/\alpha}^{N(k+1)/\alpha-1} y_m e^{-j2\pi z m/N} \right|^2$$

where $\alpha$ denotes an interval among the plurality of test values in a frequency domain, N denotes a length of discrete Fourier transform (DFT), and $y_m$ denotes the reception signal which goes through the EEP.

3. The method of claim 2, wherein:
   $\alpha$ is smaller than N and is one of integers which are the power of 2.

4. The method of claim 2, wherein:
   the first frequency offset is estimated as a test value when the sum of two adjacent partial periodograms among the partial periodograms for the plurality of test values has the maximum value.

5. The method of claim 4, wherein:
   the first frequency offset is estimated by the following equation, $$\hat{\epsilon}_I = \underset{\tilde{\epsilon}_I}{\operatorname{argmax}}\{I_\alpha(\tilde{\epsilon}_I) + I_\alpha(\tilde{\epsilon}_I + \alpha)\}$$

where $I_\alpha(\tilde{\epsilon}_I)$ denotes the partial periodograms for the test values and $I_\alpha(\tilde{\epsilon}_I + \alpha)$ denotes a partial periodogram adjacent to $I_\alpha(\tilde{\epsilon}_I + \alpha)$.

6. The method of claim 2, wherein:
   the second frequency offset is estimated by the following equation, $$\hat{\epsilon}_F = \frac{\alpha\sqrt{I_\alpha(\hat{\epsilon}_I + \alpha)}}{\sqrt{I_\alpha(\hat{\epsilon}_I)} + \sqrt{I_\alpha(\hat{\epsilon}_I + \alpha)}}$$

where $I_\alpha(\hat{\epsilon}_I)$ denotes the partial periodogram for the estimated first frequency offset and $I_\alpha(\hat{\epsilon}_I + \alpha)$ denotes the partial periodogram adjacent to $I_\alpha(\hat{\epsilon}_I)$.

7. The method of claim 2, wherein:
   the third frequency offset is estimated by repeatedly computing the following equation, $$\epsilon_{T+1} = \frac{\alpha\left\{\sqrt{I_\alpha(\hat{\epsilon}_I + \hat{\epsilon}_F + \epsilon_T + \alpha/2)} - \sqrt{I_\alpha(\hat{\epsilon}_I + \hat{\epsilon}_F + \epsilon_T + \alpha/2)}\right\}}{2\left\{\sqrt{I_\alpha(\hat{\epsilon}_I + \hat{\epsilon}_F + \epsilon_T + \alpha/2)} + \sqrt{I_\alpha(\hat{\epsilon}_I + \hat{\epsilon}_F + \epsilon_T + \alpha/2)}\right\}}$$

8. The method of claim 7, wherein:
   the equation is computed repeatedly at $\log_2 \alpha$ times, and $\alpha$ is substituted with $\alpha/2$ whenever the equation is computed repeatedly.

9. The method of claim 1, wherein:
   the EEP is performed by multiplying the reception signal with a complex conjugate of a training symbol and dividing the multiplication value by power of the training symbol.

10. An orthogonal frequency division multiplexing (OFDM) receiver in a wireless communication system, the OFDM receiver comprising:
    a radio frequency (RF) unit configured to transmit or receive a radio signal; and
    a process, operatively connected to the RF unit, and configured for:
    performing envelope equalized processing (EEP) for a reception signal,
    calculating a partial periodogram for a plurality of test values based on the reception signal which goes through the EEP,
    estimating a first frequency offset based on two partial periodograms adjacent to each other among the partial periodograms for the plurality of test values,
    estimating a second frequency offset based on the estimated first frequency offset and two partial periodograms adjacent to each other based on the estimated first frequency offset,
    repeatedly estimating a third frequency offset based on the estimated first frequency offset, the estimated second frequency offset, and two partial periodograms adjacent to each other based on the estimated first frequency offset and the estimated second frequency offset, and
    estimating a final frequency offset by adding the estimated first frequency offset, the estimated second frequency offset, and the estimated third frequency offset.

11. The OFDM receiver of claim 10, wherein:
    the partial periodograms are calculated by the following equation, $$I_\alpha(z) = \sum_{k=0}^{\alpha-1} \left| \sum_{m=Nk/\alpha}^{N(k+1)/\alpha-1} y_m e^{-j2\pi z m/N} \right|^2$$

where α denotes an interval among the plurality of test values in a frequency domain, N denotes a length of discrete Fourier transform (DFT), and $y_m$ denotes the reception signal which goes through the EEP.

12. The OFDM receiver of claim 11, wherein:
α is smaller than N and is one of integers which are the power of 2.

13. The OFDM receiver of claim 11, wherein:
the first frequency offset is estimated as a test value when the sum of two adjacent partial periodograms among the partial periodograms for the plurality of test values has the maximum value.

14. The OFDM receiver of claim 13, wherein:
the first frequency offset is estimated by the following equation, $$\hat{\epsilon}_I = \underset{\tilde{\epsilon}_I}{\mathrm{argmax}}\{I_\alpha(\tilde{\epsilon}_I) + I_\alpha(\tilde{\epsilon}_I + \alpha)\}$$

where $I_\alpha(\tilde{\epsilon}_I)$ denotes the partial periodograms for the test values and $I_\alpha(\tilde{\epsilon}_I+\alpha)$ denotes a partial periodogram adjacent to $I_\alpha(\tilde{\epsilon}_I)$.

15. The OFDM receiver of claim 11, wherein:
the second frequency offset is estimated by the following equation, $$\hat{\epsilon}_F = \frac{\alpha\sqrt{I_\alpha(\hat{\epsilon}_I + \alpha)}}{\sqrt{I_\alpha(\hat{\epsilon}_I)} + \sqrt{I_\alpha(\hat{\epsilon}_I + \alpha)}}$$

where $I_\alpha(\hat{\epsilon}_I)$ denotes the partial periodogram for the estimated first frequency offset and $I_\alpha(\hat{\epsilon}_I+\alpha)$ denotes the partial periodogram adjacent to $I_\alpha(\hat{\epsilon}_I)$.

16. The OFDM receiver of claim 11, wherein:
the third frequency offset is estimated by repeatedly computing the following equation, $$\epsilon_{T+1} = \frac{\alpha\left\{\sqrt{I_\alpha(\hat{\epsilon}_I + \hat{\epsilon}_F + \epsilon_T + \alpha/2)} - \sqrt{I_\alpha(\hat{\epsilon}_I + \hat{\epsilon}_F + \epsilon_T + \alpha/2)}\right\}}{2\left\{\sqrt{I_\alpha(\hat{\epsilon}_I + \hat{\epsilon}_F + \epsilon_T + \alpha/2)} + \sqrt{I_\alpha(\hat{\epsilon}_I + \hat{\epsilon}_F + \epsilon_T + \alpha/2)}\right\}}$$

17. The OFDM receiver of claim 16, wherein:
the equation is computed repeatedly at $\log_2 \alpha$ times, and α is substituted with α/2 whenever the equation is computed repeatedly.

18. The OFDM receiver of claim 10, wherein:
the EEP is performed by multiplying the reception signal with a complex conjugate of a training symbol and dividing the multiplication value by power of the training symbol.

19. A method of receiving an orthogonal frequency division multiplexing (OFDM) signal in a wireless communication system, the method comprising:
adjusting frequency synchronization of an OFDM reception signal;
converting the OFDM reception signal in which the time and the frequency are synchronized into a parallel signal;
performing fast Fourier transform (FFT) for the parallel signal; and
performing decoding and de-interleaving for the parallel signal which goes through the FFT,
wherein the adjusting of the frequency synchronization of the OFDM reception signal includes:
performing envelope equalized processing (EEP) for the OFDM reception signal;
calculating a partial periodogram for a plurality of test values based on the reception signal which goes through the EEP;
estimating a first frequency offset based on two partial periodograms adjacent to each other among the partial periodograms for the plurality of test values;
estimating a second frequency offset based on the estimated first frequency offset and two partial periodograms adjacent to each other based on the estimated first frequency offset;
repeatedly estimating a third frequency offset based on the estimated first frequency offset, the estimated second frequency offset, and two partial periodograms adjacent to each other based on the estimated first frequency offset and the estimated second frequency offset; and
estimating a final frequency offset by adding the estimated first frequency offset, the estimated second frequency offset, and the estimated third frequency offset.

20. An apparatus of receiving an orthogonal frequency division multiplexing (OFDM) signal in a wireless communication system, the apparatus comprising:
a synchronization block for adjusting frequency synchronization of an OFDM reception signal;
a serial/parallel converter for converting the OFDM reception signal in which the time and the frequency are synchronized into a parallel signal;
an FFT block for performing fast Fourier transform (FFT) for the parallel signal; and
a decoding/de-interleaving block for performing decoding and de-interleaving for the parallel signal which goes through the FFT,
wherein the synchronization block is configured for:
performing envelope equalized processing (EEP) for the OFDM reception signal;
calculating a partial periodogram for a plurality of test values based on the reception signal which goes through the EEP;
estimating a first frequency offset based on two partial periodograms adjacent to each other among the partial periodograms for the plurality of test values;
estimating a second frequency offset based on the estimated first frequency offset and two partial periodograms adjacent to each other based on the estimated first frequency offset;
repeatedly estimating a third frequency offset based on the estimated first frequency offset, the estimated second frequency offset, and two partial periodograms adjacent to each other based on the estimated first frequency offset and the estimated second frequency offset; and
estimating a final frequency offset by adding the estimated first frequency offset, the estimated second frequency offset, and the estimated third frequency offset.

* * * * *